Patented Sept. 1, 1925.

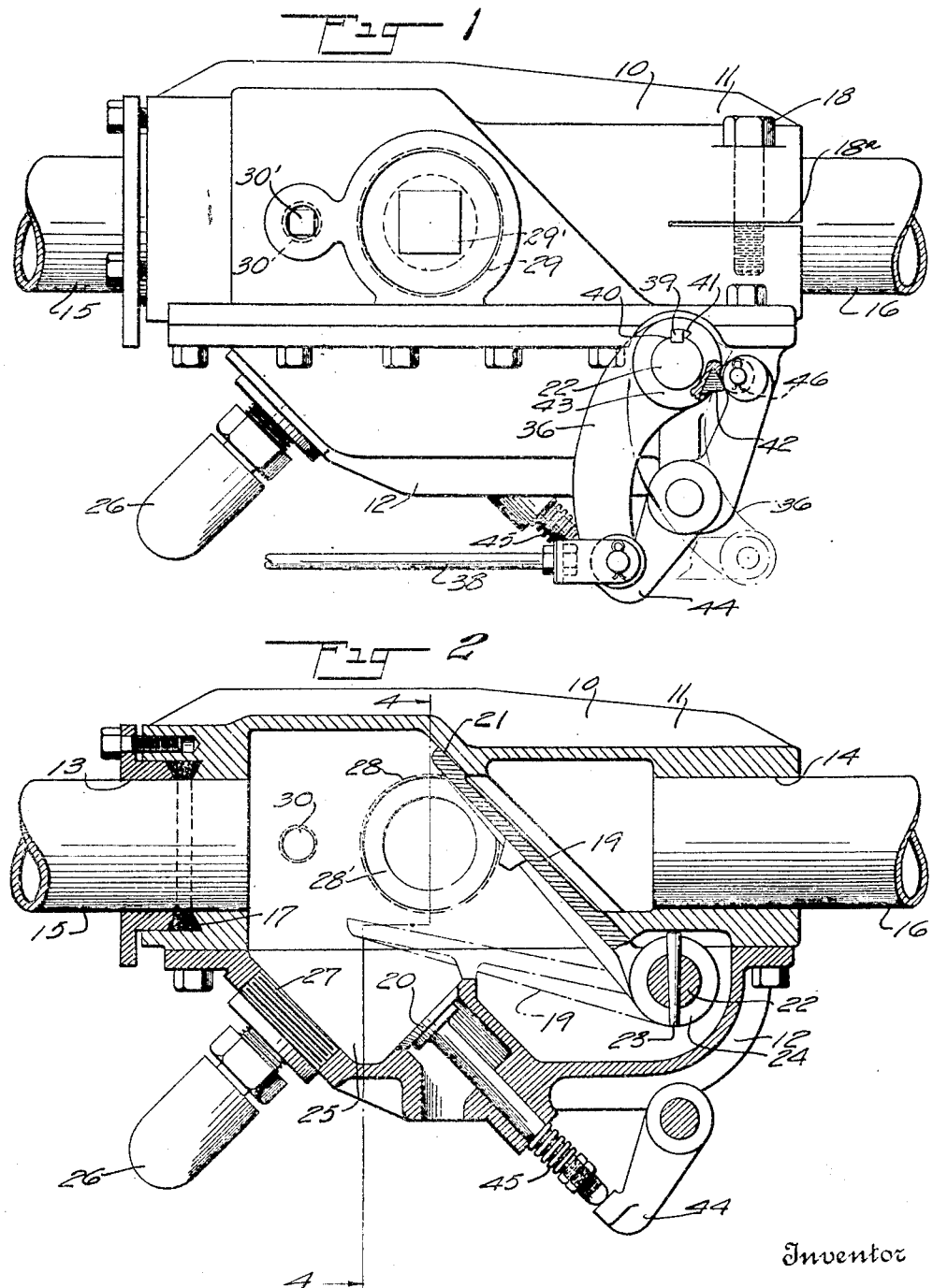

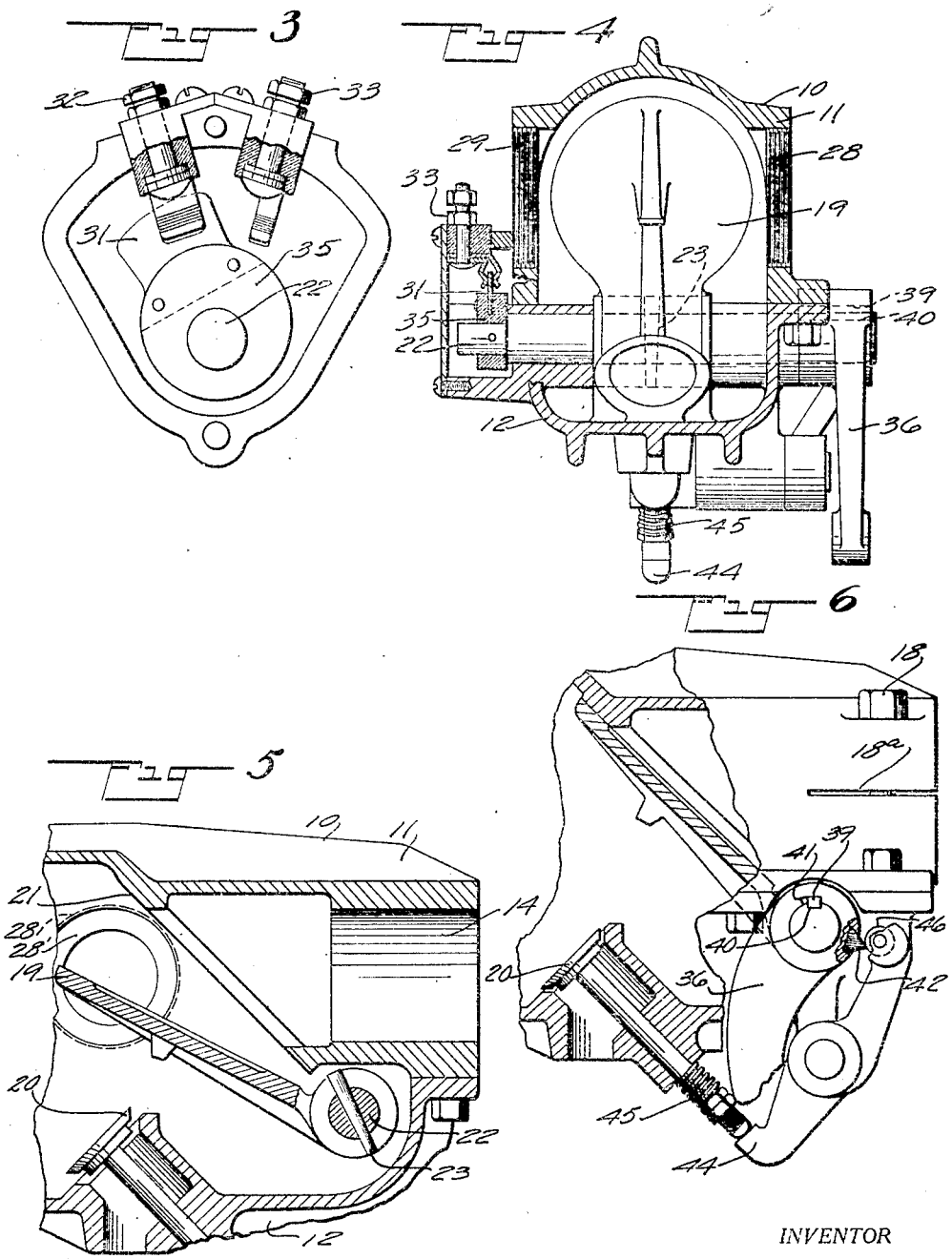

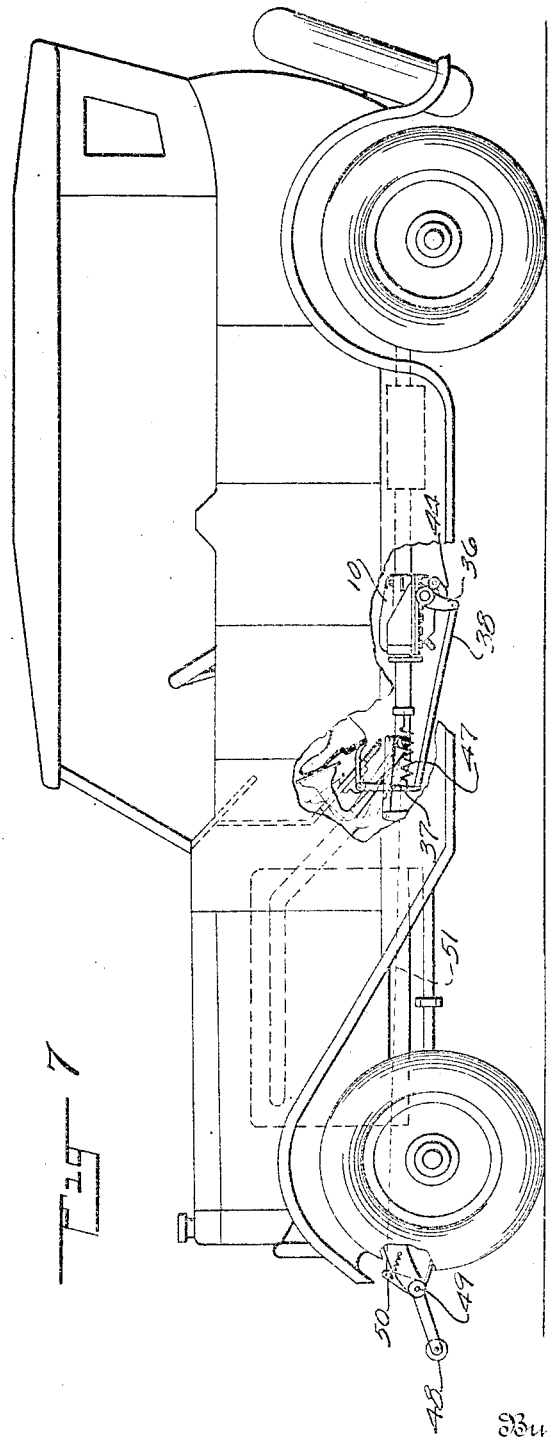

1,551,682

UNITED STATES PATENT OFFICE.

ARLINGTON MOORE, OF NEW YORK, N. Y., ASSIGNOR TO MOORE INVENTIONS CORPORATION, OF WORCESTER, MASSACHUSETTS, A CORPORATION OF MASSACHUSETTS.

COMPRESSION ENGINE BRAKE FOR AUTOMOBILES AND THE LIKE.

Application filed December 7, 1922. Serial No. 605,361.

*To all whom it may concern:*

Be it known that I, ARLINGTON MOORE, a citizen of the United States, and a resident of the borough of Manhattan, city, county and State of New York, have invented a new and useful Improvement in Compression Engine Brakes for Automobiles and the like, of which the following is a specification.

My invention relates to a compression engine brake for automobiles and the like.

The present application is directed to the improvement of the apparatus disclosed in my prior copending application for compressed gaseous fluid brake, Patent 1,519,213, granted Dec. 16, 1924.

According to my invention, the braking is done by temporarily converting the engine into a compressor for air or other gases, the engine being left in gear, preferably high gear, whereby the engine is made to serve as a brake. Such brake is particularly useful in mountain work, such as descending long grades, but is not confined to such use. It is preferably used in connection with one or more mechanical brakes, as, for example, a hand brake which can be used to lock the car when left standing.

In the drawings I have shown an embodiment of the invention, but it is to be understood that same is for illustration and for affording an understanding of the invention only, and not for limitation thereof. Fig. 1 is a side view of the valve casing interposed in the engine exhaust pipe. Fig. 2 is a longitudinal section through the casing shown in Fig. 1. Fig. 3 is an end view, with parts broken away, of the ignition circuit control device. Fig. 4 is a cross-sectional view taken on the line 4—4, Fig. 2. Fig. 5 is a fragmentary sectional view similar to Fig. 2 and showing the shut-off valve half way open and the relief valve completely open. Fig. 6 is a view generally similar to Fig. 5, and showing how the relief valve may be opened slightly without opening the shut-off valve. Fig. 7 is a side view of an automobile, with parts broken away, to illustrate the application of the invention to a motor vehicle, and Fig. 8 is a wiring diagram.

The working parts are for the most part contained in or supported by a hollow casing 10, which preferably consists of an upper portion 11 and a lower portion 12, with a ground joint between them.

Casing member 11 is inserted in place of a piece of the exhaust pipe, and is provided with a front opening 13 and a rear opening 14 in line therewith to receive the portions 15 and 16 of the exhaust pipe. The entering portion 15 of the exhaust pipe is secured in place by the exhaust packed gland 17 to make it gas tight, while it is sufficient to secure the outgoing exhaust pipe end 16 in place by means of a bolt 18, the casting being split, as at the saw-cut 19', to enable bolt 18 to exert a clamping pressure.

The working parts are carried by the lower casing member 12 and include the shut-off valve 19, relief valve 20, and cooperating parts. The flat valve seat 21 formed in casing member 11 between the inlet and outlet openings 13 and 14, affords a seat for the pivoted or clapper shut-off valve 19, which, as will be seen, closes with and opens against the direction of movement of the outgoing gases. The shaft 22, to which the valve 19 is secured, as by means of pin 23, has its bearings in the sides of casing member 12. Accurate fit of the parts is preferably secured by grinding the valve 19 in place on the seat to secure an accurate fit, then temporarily fastening the valve 19 on its seat 21, bolting and doweling the casing member 12 on casing member 11, and then boring for shaft 22 clear through both sides of the casing member 12, as well as through the hub 24 of valve 19.

The gas tight portion 25 of the casing 10 is also provided with a relief valve 20, preferably an inwardly opening poppet valve, and with a safety valve indicated at 26, and which may be of any ordinary construction, and can be set to blow off at a given pressure well under the maximum pressure the parts are adapted to withstand.

Ample access to chamber 25 is provided, as by means of screwing the safety valve 26 in the reducer 27, and by providing additional screw threaded openings 28, 29 and 30, through which access may be had to the interior of the casing by removal of plugs 28', 29' and 30'. These plugged holes may also be used for attachment of pressure operating devices of any kind, which form no part of the present application. Shaft 22 also carries the ignition control device, which is arranged to cut off the ignition when the shut-off valve is closed. In the form shown, switch member 31 is secured to shaft 22 to turn therewith, and when turned to the position of Fig. 8 the ignition circuit is completed through terminals 32 and 33, and the movable switch member 31, and when said member 31 is turned to bring it out of register with the terminal 33, as shown in Fig. 3, the ignition circuit is broken. Switch member 31 is insulated from shaft 22 by being carried on insulating disk 35.

Shaft 22 is turned by crank 36, which is connected to the foot pedal 37 by link 38. Crank 36 is provided with means to operate the relief valve 20, and in order to secure proper timing of the parts relative to one another, a lost motion connection is provided between crank 36 and shaft 22, as by seating the key 39 tightly in slot 40 of shaft 22, and making the slot 41 for key 39 in crank 36 wider than key 39. The hardened wear piece 42 set in the hub 43 of crank 36 serves as a cam to operate lever 44 which actuates valve 20 to open the same, said valve 20 being normally held closed by the adjustable tension spring 45. A roller 46 is provided on lever 44 to prevent wear by the cam member 42.

The normal position of the parts when the brake is not in use is shown—as to crank 36—in dotted lines in Fig. 1 and—as to valve 19—in dotted lines in Fig. 2, and—as to switch member 34—in Fig. 8, the parts being held in such position by spring 47, Fig. 7. It will be seen that valve 20 is closed at this time, the cam member 42 having passed upwardly to a position just beyond roller 46 (see dotted line position of cam piece 42 in Fig. 1).

On turning the crank 36 by means of the foot pedal 37 to the full line position of Fig. 1, valve 19 is closed as shown in Fig. 2, and the ignition is cut off by carrying member 31 out of engagement with terminal 33, as shown in Fig. 3. In this movement of crank 36, and, therefore, of cam 42, the relief valve 20 is momentarily opened, but closes again, the cam 42 passing over roller 46 and taking the position on the other side thereof, as shown in full lines in Fig. 1. The engine now operates as a compression pump and serves as a brake for opposing the movement of the vehicle, the transmission being left in gear, as already stated.

Upon releasing pedal 37 and therefore spring 47, crank 36 actuated by spring 47 turns somewhat by reason of the lost motion connection before turning shaft 22 and valve 19 which is firmly held closed by the compressed air or other fluid behind it. During this slight movement of crank 36, the cam wear piece 42 comes into contact with roller 46 and opens relief valve 20, valve 19 still remaining closed, as clearly shown in Fig. 6.

When pedal 37 is released to such extent that crank 36 and shaft 22 can turn beyond the limits of the lost motion connection afforded by the widened slot 41, or equivalent lost motion connection, the valve 19 is opened and the ignition circuit is also closed. Should the gaseous mixture in the exhaust conduit explode when the ignition is turned on no harm will be done as the relief valve 20 is wide open at such time. No explosive charges can be ignited in the muffler as the valve 19 is never opened until the compressed fluid behind it has been vented by the prior opening of relief valve 20. As soon as relief valve 20 opens, the compression behind valve 19 is released by the compressed gases, passing out and being discharged to the atmosphere past relief valve 20, and the compression no longer holds valve 19 shut and same can be opened by the pull exerted by spring 47 as the foot pressure on pedal 37 is further released. Complete release of pedal 37 restores the parts to the normal out-of-use positions already referred to.

It is a feature of great convenience that the braking effect can be varied as desired by slight release movements of pedal 37 made from time to time when the motion of the car is or is about to become unduly slowed down, thus venting the chamber 25 to a greater or less extent and enabling the user to adjust the back pressure on the engine in a manner to secure the braking effect best suited for the particular grade, road conditions, etc.

The brake pedal 37 is preferably located adjacent to the clutch pedal 45, as shown in Fig. 7, and with the parts so located the "clutch foot" may be used to operate the brake, the clutch being left in engaged position when the foot is taken off of it and applied to the brake pedal. This arrangement permits the driver to operate both pedals simultaneously with the same foot when desired. For example, the movement of car and engine immediately after braking is relatively slow, and a slight release of the clutch pedal is desirable at and immediately after the moment of switching on the ignition by release of brake pedal 37, so that the engine can be gotten to running smoothly under power, without the bucking or chugging which might result if the clutch were not released somewhat. The location of brake and clutch pedal in such position that either or both can be operated by the same foot, enables the transition to be carried out easily and smoothly after only a little practice.

The brake of the present invention, while ordinarily operated by the foot pedal, may be connected up so as to be operated automatically in case of collision, as, for example, when the car strikes an obstacle. To illustrate one of the numerous ways in which such result can be accomplished, I have shown in Fig. 7 a bumper 48 having a pivoted mounting on the car at 49 and provided with an arm 50, which is connected to pedal lever 37 by a flexible connection, such as a wire 51. When the bumper illustrated is forcibly struck it turns on its pivot imparting a pull to wire 51 which actuates the brake in the same way as when foot pressure is applied to the pedal. The means of operation may be variously modified so long as provision is made for operating the brake and cutting off the ignition current automatically when the car or a part or extension thereof strikes against or is struck by another car, a stationary obstacle or the like, constituting a highly effective and completely automatic emergency braking device.

I claim:

1. In the exhaust conduit of an internal combustion motor, a flapper cut-off valve closing in the direction of gas flow, and an inwardly opening relief valve of the poppet type between the cut-off valve and the motor.

2. In the exhaust conduit of an internal combustion motor, a flapper cut-off valve closing in the direction of outward flow of gases, an inwardly opening poppet valve between the cut-off valve and the motor, and means for opening the latter prior to the opening of the former.

3. In the exhaust conduit of an internal combustion motor, a valve casing, a cut-off valve therein closing with the flow of outgoing gases, means for opening and closing the valve, a relief valve between the cut-off valve and the motor, and means for opening the relief valve prior to the opening of the cut-off valve.

4. The combination with an automotive vehicle and its internal combustion motor comprising an exhaust conduit and an ignition circuit, of a valve casing forming a part of the exhaust conduit, a substantially flat pivoted cut-off valve closing in the direction of outward flow of the gases, an inwardly opening relief valve in said casing between the cut-off valve and the motor, an ignition switch adapted to be operated upon the turning of the cut-off valve on its pivot, means for opening and closing the cut-off valve, and means inter-connected therewith for operating the relief valve, same being arranged to open the relief valve prior to the opening of the cut-off valve.

5. In a device for converting into a fluid compression brake the internal combustion motor of an automotive vehicle, a hollow casing forming part of the exhaust conduit, a flat pivoted cut-off valve in said casing closing with outward flow of gases, an inwardly opening poppet valve in the wall of that part of the casing between the cut-off valve and the motor, a crank for operating the cut-off valve and being provided with a lost motion connection with said cut-off valve, and means dependent upon such lost motion connection for causing the opening of the relief valve prior to the opening of the cut-off valve.

6. In a device for converting into a fluid compression brake the internal combustion engine of an automotive vehicle, a hollow casing forming part of the engine exhaust conduit and having a valve seat extending thereacross, a flat pivoted cut-off valve adapted to close against such seat, the closing movement thereof being in the direction of flow of outgoing gases, an inwardly opening relief valve for venting that part of the casing between the cut-off valve and the engine, a crank having a lost motion connection with the cut-off valve, a lever for opening the relief valve, and cam means on the crank for turning said lever to open the relief valve prior to the opening of the cut-off valve.

7. In apparatus for converting into a gaseous fluid compression brake an internal combustion motor comprising an exhaust conduit and an ignition circuit, the combination of a valve for closing the exhaust conduit, a relief valve between the first named valve and the motor, and control means for said valves, said control means being so related that the relief valve is opened prior to the opening of the exhaust conduit valve.

8. In apparatus for converting into a fluid compression brake an internal combustion engine comprising an exhaust conduit and an ignition circuit, a shut-off valve for the exhaust conduit, a relief valve between the cut-off valve and the motor, means movable with said shut-off valve for breaking and closing the ignition circuit as said valve is closed and opened respectively, and means whereby when both shut-off and relief valves have been closed, the relief valve is opened prior to the opening of the cut-off valve.

9. In apparatus for converting into a fluid compression brake an internal combustion engine comprising an exhaust conduit and an ignition circuit, a shut-off valve for the exhaust conduit closing in the direction of outward passage of gases through said conduit and adapted to be held closed by compressed gases behind it holding it to its seat, a relief valve in said conduit between the first-named valve and the motor, means for opening said relief valve when both valves are closed, so that the relief valve is opened prior to the opening of the shut-off valve, thereby releasing the compression behind the shut-off valve and permitting the shut-off valve to be opened.

In testimony whereof, I have signed my name hereto.

ARLINGTON MOORE.